United States Patent
Ono

(10) Patent No.: US 7,643,070 B2
(45) Date of Patent: Jan. 5, 2010

(54) MOVING IMAGE GENERATING APPARATUS, MOVING IMAGE GENERATING METHOD, AND PROGRAM

(75) Inventor: Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 657 days.

(21) Appl. No.: 11/369,771

(22) Filed: Mar. 8, 2006

(65) Prior Publication Data

US 2006/0203109 A1 Sep. 14, 2006

(30) Foreign Application Priority Data

Mar. 9, 2005 (JP) .............................. 2005-066343
Feb. 23, 2006 (JP) .............................. 2006-047322

(51) Int. Cl.
*H04N 5/262* (2006.01)
*H04N 5/225* (2006.01)

(52) U.S. Cl. .................................. 348/239; 348/220.1

(58) Field of Classification Search .................. 348/239
See application file for complete search history.

(56) References Cited

U.S. PATENT DOCUMENTS

| | | | |
|---|---|---|---|
| 5,416,899 A | * | 5/1995 | Poggio et al. ................ 345/475 |
| 5,659,382 A | * | 8/1997 | Rybczynski ................. 352/46 |
| 6,031,538 A | * | 2/2000 | Chupeau et al. ............. 345/419 |
| 7,123,275 B2 | * | 10/2006 | Takeshima et al. .......... 345/629 |
| 7,200,261 B2 | * | 4/2007 | Ono ........................... 382/154 |
| 2003/0043271 A1 | * | 3/2003 | Dantwala ................. 348/207.1 |

FOREIGN PATENT DOCUMENTS

| | | | |
|---|---|---|---|
| JP | 2003-037808 | * | 7/2003 |
| JP | 2003-219341 A | | 7/2003 |

* cited by examiner

*Primary Examiner*—Sinh Tran
*Assistant Examiner*—Hung H Lam
(74) *Attorney, Agent, or Firm*—Birch, Stewart, Kolasch & Birch, LLP

(57) ABSTRACT

A moving image generating apparatus of the present invention generates moving image data that is smoothly replayed from a taken still image. The apparatus includes: an image storing section that stores a plurality of captured images continuously taken in an exposure time shorter than a frame period of a moving image; a movement computing section that computes a movement of a subject between a timing at which one captured image is taken and a timing at which a captured image taken next to the one captured image is taken, based on a change of a position of the subject in the plurality of captured images; a frame image generating section that performs a blurring processing in a direction in which the subject included in the one captured image moves to generate a frame image from the one captured image, according to the movement of the subject computed from the movement computing section; and a moving image recording section that records, as a moving image, a plurality of frame images each generated from the frame image generating section in association with each of the plurality of captured images.

13 Claims, 6 Drawing Sheets

MOVING IMAGE GENERATING APPARATUS, MOVING IMAGE GENERATING METHOD, AND PROGRAM

CROSS REFERENCE TO THE RELATED APPLICATION

This patent application claims priority from Japanese Patent Applications Nos. JP 2005-066343 filed on Mar. 9, 2005 and 2006-047322 filed on Feb. 23, 2006, the contents of which are incorporated herein by reference.

BACKGROUND OF THE INVENTION

1. Field of the Invention

The present invention relates to a moving image generating apparatus, a moving image generating method, and a program. More particularly, the present invention relates to a moving image generating apparatus and a moving image generating method for generating a moving image, and a program for the moving image generating apparatus.

2. Description of Related Art

Conventionally, there has been a movie still camera that obtains a moving image with a smooth movement even when taking a still image during recording a moving image, as disclosed, for example, in Japanese Patent Application Publication 2003-219341. According to this technique, moving image data of which one piece has 640 pixels in a horizontal direction and 480 pixels in a vertical direction are obtained at a constant period. Then, when a release button is pushed during recording the moving image data, still image data with 1280 pixels in a horizontal direction and 960 pixels in a vertical direction are acquired and are recorded in a memory card. At this time, a reduced image having the same magnitude as a piece of image for a moving image is generated from the still image data, and is inserted at the acquisition position of the still image data.

However, according to the technique of Japanese Patent Application Publication 2003-219341, when a user wants to see a still image at a timing aside from the timing at which the user pushed a release button, it is necessary to generate still image data from one piece of moving image data having resolution inferior to that of the still image data. It is desirable that a user can appreciate a clear still image at an arbitrary timing desired by the user in concurrence with enjoying a moving image. It is desirable that a clear still image is taken in a short exposure time than an exposure time for a moving image. However, there has been a problem that a movement of a subject is awkward when the still image taken in the short exposure time is replayed as a piece of image for a moving image.

SUMMARY OF THE INVENTION

Therefore, it is an object of the present invention to provide a moving image generating apparatus, a moving image generating method, and a program that can solve the foregoing problems. The above and other objects can be achieved by combinations described in the independent claims. The dependent claims define further advantageous and exemplary combinations of the present invention.

According to the first aspect of the present invention, there is provided a moving image generating apparatus. The apparatus includes: an image storing section that stores a plurality of captured images continuously taken in a predetermined exposure time; a movement computing section that computes a movement of a subject between a timing at which one captured image is taken and a timing at which a next captured image taken next to the one captured image is taken, based on a change of a position of the subject in the plurality of captured images; a frame image generating section that performs an image processing on the plurality of captured images to generate a frame image of moving image from the one captured image, in order that a blurring amount of an areal image of the subject included in the one captured image is larger than a blurring amount of other areal images, according to the movement of the subject computed from said movement computing section; and a moving image recording section that records, as a moving image, a plurality of frame images each generated from said frame image generating section in association with each of the plurality of captured images.

The frame image generating section may perform a blurring process on the areal image of the subject included in the one captured image in a direction in which the subject included in the one captured image moves, to generate a frame image from the one captured image. The frame image generating section may perform a blurring process on the areal image of the subject included in the one captured image to generate a frame image from the one captured image, so as to show a captured image taken in an exposure time longer than an exposure time when the one captured image has been taken, according to the movement of the subject computed from said movement computing section.

The moving image generating apparatus may further include a predictive image generating section that generates a predictive image that may be taken when a subject is taken between the timing at which the one captured image has been taken and the timing at which the next captured image has been taken, based on the movement of the subject computed from said movement computing section, and the frame image generating section may perform a blurring process on the areal image of the subject included in the one captured image to generate a frame image from the one captured image, by overlapping the predictive image generated from said predictive image generating section on the one captured image.

The predictive image generating section may generate a plurality of predictive images that may be taken when a subject is continuously taken at a predetermined interval between the timing at which the one captured image has been taken and the timing at which the next captured image has been taken, and the frame image generating section may perform a blurring process on the areal image of the subject included in the one captured image to generate a frame image from the one captured image, by overlapping the plurality of predictive images generated from said predictive image generating section on the one captured image.

The moving image generating apparatus may further include a an image capturing section that continuously takes a captured image in a predetermined exposure time, and the image storing section may store a plurality of captured images taken by said image capturing section. The moving image generating apparatus may further include a moving image replaying section that continuously displays the plurality of frame images stored on said moving image recording section to replay them as a moving image.

The movement computing section may compute a movement amount by which the subject moves between the timing at which the one captured image has been taken and the timing at which the next captured image has been taken, based on the change of the position of the subject in the plurality of captured images, and the frame image generating section may perform a blurring process with a larger blurring amount on the areal image of the subject included in the one captured image to generate a frame image of moving image from the one captured image, when the movement amount of the subject computed from said movement computing section is larger.

The movement computing section may compute a speed of the subject between the timing at which the one captured image has been taken and the timing at which the next captured image has been taken, based on the change of the position of the subject in the plurality of captured images and the time at which the plurality of captured images have been taken, and the frame image generating section may perform a blurring process with a larger blurring amount on the areal image of the subject included in the one captured image to generate a frame image of moving image from the one captured image, when the magnitude of the speed of the subject computed from said movement computing section is larger.

The moving image generating apparatus may further include a distance acquiring section that acquires a distance between a position of a subject on a display screen, on which the plurality of frame images recorded in said moving image recording section are displayed, and a position of an observer who observes the plurality of frame images displayed on the display screen, and the frame image generating section may perform a blurring process with a larger blurring amount on the areal image of the subject included in the one captured image to generate a frame image of moving image from the one captured image, when said distance acquiring section acquires a smaller distance.

The moving image generating apparatus may further include a distance acquiring section that acquires a distance between a view point of an observer and the subject of which the movement is computed by said movement computing section in a three-dimensional display space, when said moving image recording section records the plurality of frame images in order to make the observer observe a moving image by three-dimensional display, and the frame image generating section may perform a blurring process with a larger blurring amount on the areal image of the subject included in the one captured image to generate a frame image of moving image from the one captured image, when said distance acquiring section acquires a smaller distance.

According to the second aspect of the present invention, there is provided a moving image generating method. The method includes: an image storing step of storing a plurality of captured images continuously taken in a predetermined exposure time; a movement computing step of computing a movement of a subject between a timing at which one captured image is taken and a timing at which a next captured image taken next to the one captured image is taken, based on a change of a position of the subject in the plurality of captured images; a frame image generating step of performing an image processing on the plurality of captured images to generate a frame image from the one captured image, in order that a blurring amount of an areal image of the subject included in the one captured image is larger than a blurring amount of other areal images, according to the movement of the subject computed in said movement computing step; and a moving image recording step of recording, as a moving image, a plurality of frame images each generated in said frame image generating step in association with each of the plurality of captured images.

According to the third aspect of the present invention, there is provided a program for a moving image generating apparatus that generates a moving image. The program making the moving image generating apparatus function as: an image storing section that stores a plurality of captured images continuously taken in a predetermined exposure time; a movement computing section that computes a movement of a subject between a timing at which one captured image is taken and a timing at which a next captured image taken next to the one captured image is taken, based on a change of a position of the subject in the plurality of captured images; a frame image generating section that performs an image processing on the plurality of captured images to generate a frame image from the one captured image, in order that a blurring amount of an areal image of the subject included in the one captured image is larger than a blurring amount of other areal images, according to the movement of the subject computed from said movement computing section; and a moving image recording section that records, as a moving image, a plurality of frame images each generated from said frame image generating section in association with each of the plurality of captured images.

The summary of the invention does not necessarily describe all necessary features of the present invention. The present invention may also be a sub-combination of the features described above.

According to the present invention, it is possible to generate moving image data that is smoothly replayed from a taken still image.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
FIG. 1 is a view exemplary showing a use environment of a moving image generating apparatus.

FIG. 1 is a view exemplary showing a use environment of a moving image generating apparatus 160 according to an embodiment of the present invention. In FIG. 1, a camera is shown as an example of the moving image generating apparatus 160. The moving image generating apparatus 160 continuously takes a subject in an exposure time shorter than an exposure time when taking a moving image, and records the taken plurality of captured images. Then, the moving image generating apparatus 160 spuriously generates and records frame images for a moving image by judging a movement of a subject from the taken image to perform a blurring process on the subject in a moving direction of the subject. Then, the moving image generating apparatus 160 continuously replays the generated frame images when a user 180 instructs the apparatus 160 to replay a moving image, and displays a captured image taken at an timing instructed by the user when the user 180 instructs the apparatus 160 to display a still image taken at an arbitrary timing.

In addition, the moving image generating apparatus 160 may be a digital still camera, a camera-equipped portable telephone, a PDA, or the like. Then, the moving image generating apparatus 160 may display a generated moving image on, e.g., a display device such as a monitor screen, or may output moving image data including the generated frame image to the outside. Moreover, the moving image generating apparatus 160 may be a personal computer, an electronic album, an HDTV, and may receive a plurality of images from a camera and generate frame images for a moving image to output them by recording or displaying them as a moving image. In addition, a frame image in the present embodiment means a moving image configuration image making up a moving image, and for example is a concept including a field image expressing one frame image by means of a plurality of images.

According to the moving image generating apparatus 160 described above, it is possible to provide a moving image that is smoothly replayed to the user 180 and provide a clear still image in an arbitrary timing to the user 180. Therefore, for example, in cases where the user 180 takes images by means of the moving image generating apparatus 160 during watching sports, the user 180 can enjoy watching sports without being preoccupied with a shutter chance taking a still image. Then, the user 180 can slowly appreciate moving images and still images later.

Figure 2:
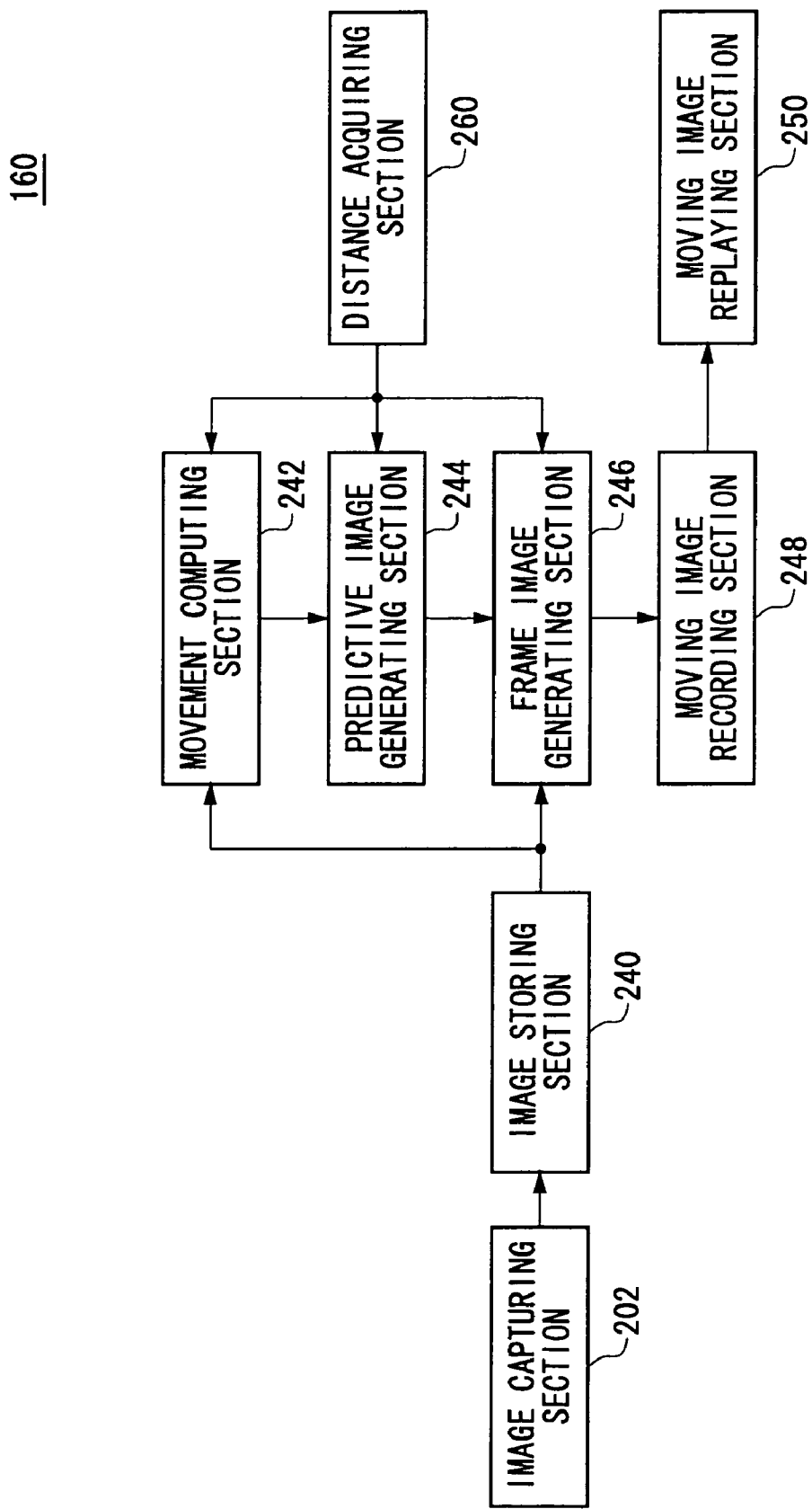
FIG. 2 is a view exemplary showing a block configuration of a moving image generating apparatus.

FIG. 2 is a view exemplary showing a block configuration of the moving image generating apparatus 160. The moving image generating apparatus 160 includes an image capturing section 202, an image storing section 240, a movement computing section 242, a predictive image generating section 244, a frame image generating section 246, a moving image recording section 248, and a moving image replaying section 250.

The image capturing section 202 continuously takes captured images in a predetermined exposure time. For example, the image capturing section 202 continuously takes captured images in an exposure time shorter than a frame period of a moving image. Specifically, the image capturing section 202 receives light from a subject via an image pickup device such as a CCD to take the subject. For example, when frame images of moving image should be acquired in 1/60 second period, the image capturing section 202 continuously takes captured images in an exposure time shorter than an exposure time when one frame image of moving image is acquired in 1/60 second. At this time, the image capturing section 202 controls a diaphragm to take a captured image with the generally same brightness as that of the frame image of moving image.

The image storing section 240 stores a plurality of captured images continuously taken in a predetermined exposure time. For example, the image storing section 240 stores the plurality of captured images continuously taken in an exposure time shorter than a frame period of a moving image. More specifically, the image storing section 240 stores the plurality of captured images taken by the image capturing section 202.

The movement computing section 242 computes a movement of a subject between the timing at which one captured image has been taken and the timing at which a captured image taken next to the one captured image has been taken, based on a change of a position of the subject in the plurality of captured images. For example, the movement computing section 242 computes the position of the subject in one or more timings between the timing at which one captured image has been taken and the timing at which a captured image taken next to the one captured image has been taken.

The predictive image generating section 244 generates a predictive image that may be taken when a subject is taken between the timing at which the one captured image has been taken and the timing at which the captured image taken next to the one captured image has been taken based on the movement of the subject computed from the movement computing section 242.

The frame image generating section 246 performs an image processing on the plurality of captured images to generate a frame image of moving image from the one captured image, in order that a blurring amount of an areal image of the subject included in the one captured image is larger than a blurring amount of other areal images, according to the movement of the subject computed from the movement computing section 242. Specifically, the frame image generating section 246 performs a blurring process on an areal image of the subject included in the one captured image to generate a frame image from the one captured image according to the movement of the subject computed from the movement computing section 242. Specifically, the frame image generating section 246 performs a blurring process in a direction in which the subject included in the one captured image moves, in order to generate a frame image from the one captured image.

More specifically, the frame image generating section 246 performs a blurring process on the areal image of the subject included in the one captured image to generate a frame image from the one captured image, so as to show a captured image taken in an exposure time longer than an exposure time when the one captured image has been taken, according to the movement of the subject computed from the movement computing section 242. Further specifically, the frame image generating section 246 performs a blurring process on the areal image of the subject included in the one captured image to generate a frame image from the one captured image by overlapping the predictive image generated from the predictive image generating section 244 on the one captured image.

In addition, the predictive image generating section 244 may generate a plurality of predictive images that may be taken when a subject is continuously taken at a predetermined interval between the timing at which the one captured image has been taken and the timing at which the captured image taken next to the one captured image. Then, the frame image generating section 246 may perform a blurring process on the areal image of the subject included in the one captured image to generate a frame image from the one captured image by overlapping the plurality of predictive images generated from the predictive image generating section 244 on the one captured image.

The moving image recording section 248 records, as a moving image, a plurality of frame images each generated the frame image generating section 246 in association with each of the plurality of captured images. Then, the moving image replaying section 250 continuously displays the plurality of frame images recorded in the moving image recording section 248 to replay them as a moving image.

In addition, the moving image generating apparatus 160 may have a function generating a moving image, excepting a function taking an image and a function displaying a moving image, among functions of the moving image generating apparatus 160 described in FIG. 2. For example, the moving image generating apparatus 160 may include the image storing section 240, the movement computing section 242, the predictive image generating section 244, the frame image generating section 246, and the moving image recording section 248. For example, the moving image generating apparatus 160 may be an apparatus that receives a plurality of captured images continuously taken in an exposure time shorter than a frame period of a moving image, which are taken by an image capturing apparatus such a camera, and a time or a timing at which each image has been taken, and generates frame images to record them as a moving image. Then, the moving image generating apparatus 160 may output the recorded moving image data outside the moving image generating apparatus 160.

The movement computing section 242 computes a movement amount by which the subject has moved between the timing at which the one captured image has been taken and the timing at which the next captured image has been taken based on the change of the position of the subject in the plurality of captured images. Then, the frame image generating section 246 performs a blurring process on the areal image of the subject included in the one captured image with a larger blurring amount to generate a frame image of moving image from the one captured image when the movement amount of the subject computed from the movement computing section 242 is larger.

Moreover, the movement computing section 242 computes a speed of the movement of the subject between the timing at which the one captured image has been taken and the timing at which the next captured image has been taken based on the change of the position of the subject in the plurality of captured images and the time at which the captured image has been taken. Then, the frame image generating section 246 performs a blurring process with a larger blurring amount on the areal image of the subject included in the one captured image to generate a frame image of moving image from the one captured image when the magnitude of the speed of the subject computed from the movement computing section 242 is larger.

Moreover, a distance acquiring section 260 acquires a distance between a position of a subject on a display screen, on which the plurality of frame images recorded in the moving image recording section 248 are displayed, and a position of an observer who observes the plurality of frame images displayed on the display screen. Then, the frame image generating section 246 performs a blurring process with a larger blurring amount on the areal image of the subject included in the one captured image to generate a frame image of moving image from the one captured image when the distance acquiring section 260 acquires a smaller distance. Specifically, the movement computing section 242 computes a larger movement amount when the distance acquired from the distance acquiring section 260 is larger. Then, the frame image generating section 246 performs a blurring process with a larger blurring amount to generate a frame image when the movement amount computed from the movement computing section 242 is larger.

In addition, the distance acquiring section 260 may acquire a distance between a view point of the observer and the subject of which the movement is computed by the movement computing section 242 in a three-dimensional display space, when the moving image recording section 248 records the plurality of frame images in order to make the observer observe a moving image by three-dimensional display. Then, the frame image generating section 246 performs a blurring process with a larger blurring amount on the areal image of the subject included in the one captured image to generate a frame image of moving image from the one captured image, when the distance acquiring section 260 acquires a smaller distance. Specifically, the movement computing section 242 computes a larger movement amount when the distance acquired from the distance acquiring section 260 is larger.

According to the moving image generating apparatus 160 described above, it is possible to generate smoothly replayed frame images for a moving image from images for a still image taken in an exposure time shorter than an exposure time for a moving image. For this reason, the user 180 can easily see a clear still image at an arbitrary timing desired by the user 180 while enjoying a moving image.

Figure 3:
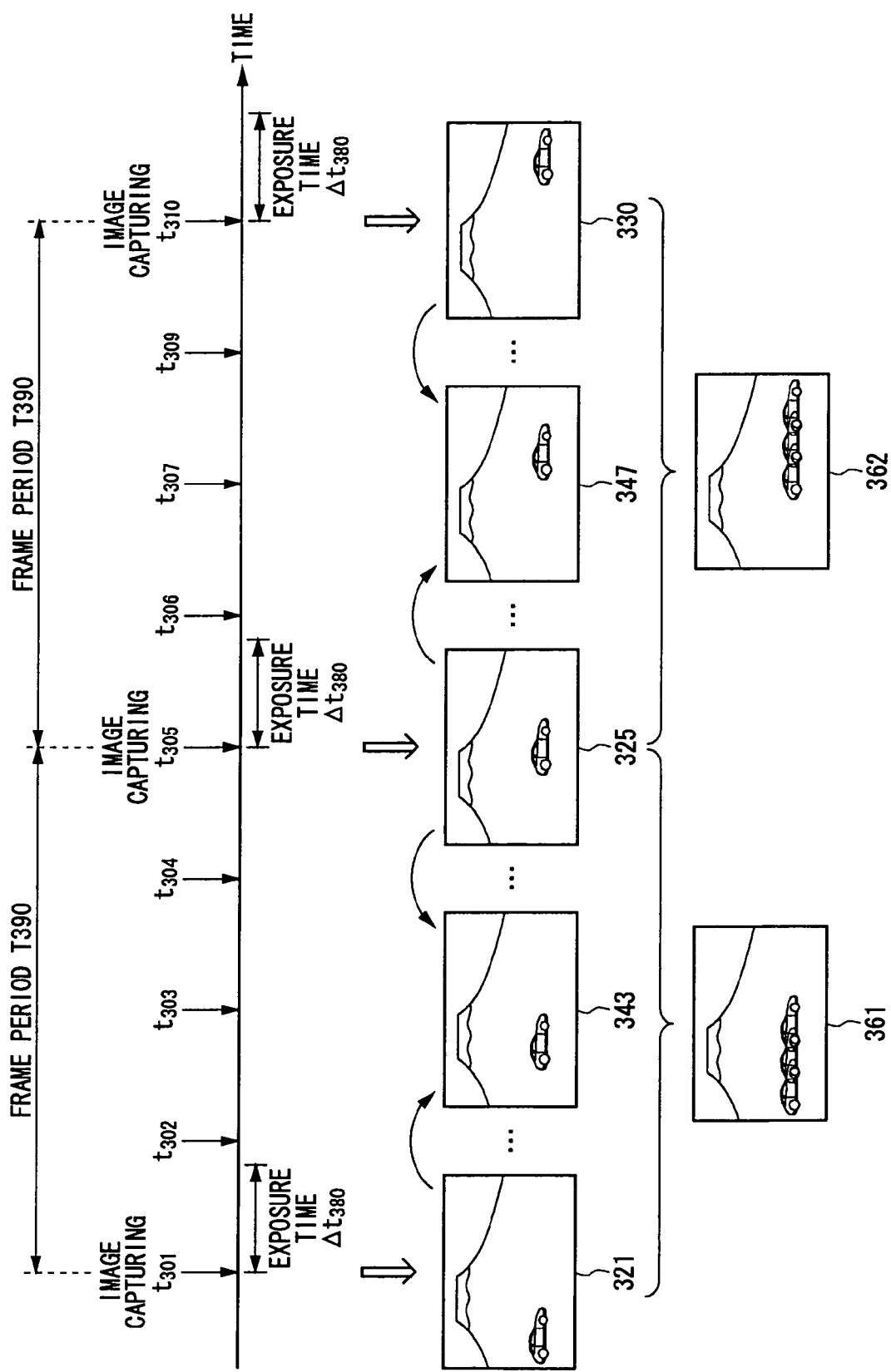
FIG. 3 is a view exemplary showing a process of generating a moving image frame.

FIG. 3 is a view exemplary showing a process of generating a moving image frame. The image capturing section 202 takes images in an exposure time Δt380 shorter than a frame period T390, in order to generate a frame image obtained in the frame period T390 of a moving image. For example, the image capturing section 202 takes images in an exposure time of 1/1000 second or 1/10000 second shorter than 1/60 second, with respect to a frame period 1/60 second of a moving image. In an example of FIG. 3, the image capturing section 202 takes a subject at times t301, t305, and t310 in an image capturing period of the frame period T390. In addition, an image capturing period of a subject by the image capturing section 202 may be shorter or longer than the frame period T390.

Then, the movement computing section 242 detects a position on an image to be occupied by the same subject from a captured image 321 and a captured image 325 taken at the time t301 and the time t305. Specifically, the movement computing section 242 extracts an outline of a subject from the captured image 321 and the captured image 325 taken at the time t301 and the time t305 by means of edge extraction or the like. Then, the movement computing section 242 judges a position on an image of the same subject by means of pattern matching between outlines of subjects obtained from images at the time t301 and the time t305. Then, the movement computing section 242 determines a subject position on the image that may be taken at a time t303, based on positions of the subject on the image at the time t301 and the time t305 and a temporal position of the time t303 between the t301 and the t305.

Then, the predictive image generating section 244 generates a predictive image 343 that may be taken at the time t303 based on the position of the subject on the image computed by the movement computing section 242. Then, the frame image generating section 246 overlaps the captured image 321, the predictive image 343, and the captured image 325, and generates a frame image 361. Similarly, a predictive image 347 is generated from the captured image 325 and a captured image 330 at the time t305 and a time t310, and the captured image 325, the predictive image 347, and the captured image 330 are overlapped to generate a frame image 362.

In addition, the movement computing section 242 may compute a position of a subject in images that may be taken at a plurality of timings between the time t301 and the time t305, e.g., times t302, t303, and t304. Then, the predictive image generating section 244 may generate a predictive image for each of the times t302, t303, and t304 to overlapping the generated plurality of predictive images, the captured image 321, and the captured image 325, in order to generate one frame image. In addition, the frame period T390 may be set by the user 180. Moreover, the image capturing section 202 may change an image capturing period according to a speed by which the position of the same subject moves on the image. Moreover, when the speed of the moving subject is faster, the image capturing section 202 may take the subject in a shorter exposure time. In addition, in the above, it would be described about an example of an operation of the case when the frame image generating section 246 performs a blurring process on the subject of which the movement has been computed by the movement computing section 242. However, the frame image generating section 246 may perform an image processing emphasizing sharpness on an area except the area of the subject of which the movement has been computed by the movement computing section 242. By means of an image processing described above, the moving image generating apparatus 160 can increase a blurring amount of an areal image of the subject, of which the movement has been computed, larger than a blurring amount of the other areal image that is an image on the subject area of which the movement has not been computed. In this manner, the moving image generating apparatus 160 can make a frame image for a moving image, in which a movement of a moving subject sees smoothly, from the plurality of images on which the subject has been taken clearly, and provide the frame image to the user 180.

Figure 4:
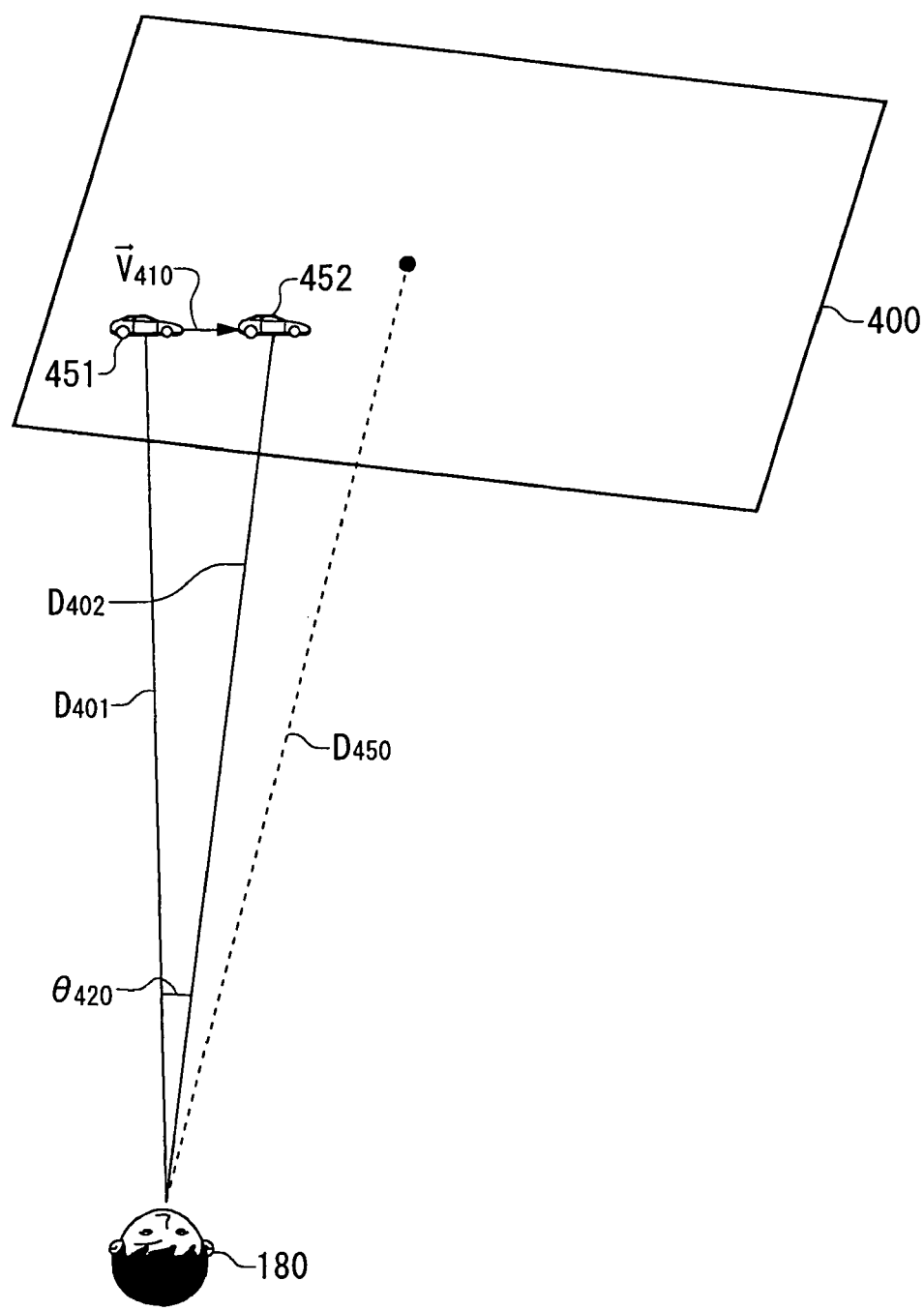
FIG. 4 is a view exemplary showing a computation method of a blurring amount.

FIG. 4 is a view exemplary showing a computation method of a blurring amount. The moving image replaying section 250 makes a display screen 400 continuously display the plurality of frame images recorded in the moving image recording section 248, in order to display a two-dimensional moving image on the display screen 400. The display screen 400 may be a displaying apparatus such as a liquid crystal. It will be below described about an example of a computation method of a blurring amount when displaying a two-dimensional moving image on the display screen 400.

The distance acquiring section 260 acquires a distance D450 between the user 180 who is a viewer of a moving image and the display screen 400. For example, the distance acquiring section 260 may measure the distance D450 by means of a distance measuring device such as a laser macrometer provided in the vicinity of the display screen 400. For example, the distance D450 may be a distance between a position of the user 180 and a central position of the display screen 400.

Then, the movement computing section 242 computes mobile vector V410 from a position 451 to a position 452 as a movement amount of the subject when detecting a movement of the subject from the position 451 to the position 452 on the display screen 400 between the continued frame images. In addition, the movement computing section 242 computes the position 452 from the position 451 with reference to an image size of the display screen 400 previously stored. Moreover, the distance acquiring section 260 computes a distance D401 from the user 180 to the position 451 and a distance D402 from the user 180 to the position 452, from the distance D450, the position 451, and the position 452. Then, the predictive image generating section 244 computes a value $\alpha$ obtained by dividing the V410 by a mean value of the D401 and the D402 as an index indicative of a blurring amount. A blurring amount is largely computed when the magnitude of mobile vector V410 is larger and is largely computed when a sum of the distances D401 and D402 is smaller.

Then, the predictive image generating section 244 generates a predictive image according to the blurring amount. As described in reference to FIG. 3, the predictive image generating section 244 can generate the predictive image of which the subject moves in a moving direction shown by the mobile vector V410 computed from the movement computing section 242, in order to perform a blurring process in the direction shown by the mobile vector V410. At this time, when the magnitude of the value $\alpha$ acting as an index of a blurring amount is larger, the predictive image generating section 244 may generate more predictive images. Then, the frame image generating section 246 generates a frame image by averaging the predictive images generated from the predictive image generating section 244 and overlapping the averaged image on the captured image. In this way, the frame image generating section 246 can generate a frame image of which the subject having a larger movement amount has been blurred more largely.

In addition, the predictive image generating section 244 may compute, as a blurring amount, a value obtained by dividing a value, which is made by dividing the mobile vector V410 by the image capturing time difference that is the difference between the time at which the subject has been taken at the position 451 and the time at which the subject has been taken at the position 452, by a mean value of the D401 and the D402. Moreover, the predictive image generating section 244 may compute an amount proportional to the value $\alpha$ as a blurring amount, or may compute a value made by converting the value $\alpha$ into a predetermined function as a blurring amount. Moreover, the predictive image generating section 244 may compute an angle $\theta$420, which is made by a line linking the user 180 and the position 451 and a line linking the user 180 and the position 452, as a blurring amount. Moreover, the predictive image generating section 244 may compute a value made by dividing the angle $\theta$420 by the image capturing time difference as a blurring amount.

In addition, when the user 180 replays the moving image, the moving image generating apparatus 160 may generate frame images from the images stored on the image storing section 240 and at the same time continuously display the generated frame images, in order to replay them as a moving image using the moving image replaying section 250. In this way, the moving image generating apparatus 160 can replay a moving image made by blurring a moving subject with an appropriate blurring amount according to a distance between an observer and a display screen during replaying the moving image. In addition, the distance acquiring section 260 may acquire the distance between the observer and the display screen by an input from the user 180. For example, when the user 180 appreciates a moving image with a home television, the distance acquiring section 260 may acquire a distances from a position appreciating the television to the television by an input from the user 180. Besides, when a moving image generated from the moving image generating apparatus 160 is shown in a movie theater, the distance acquiring section 260 may acquire a typical distance value between a position of a seat in the movie theater and a screen by an input from the user 180. In this case, it is desirable that the distance acquiring section 260 acquires the screen size of a television or a screen.

As described above, the moving image generating apparatus 160 generates a frame image obtained by blurring a moving object more largely when the user 180 appreciates a moving image from a nearer position to the display screen 400. As the user 180 is near to the display screen 400, an amount of change of a sight line of the user 180 following an object increases, and thus the user 180 feels as if the object moves sooner. In this case, since the moving image generating apparatus 160 largely blurs the object moving at a position nearer to the user 180, the moving image generating apparatus 160 can provide a moving image, in which a movement of a moving object sees smoothly, to the user 180.

Figure 5:
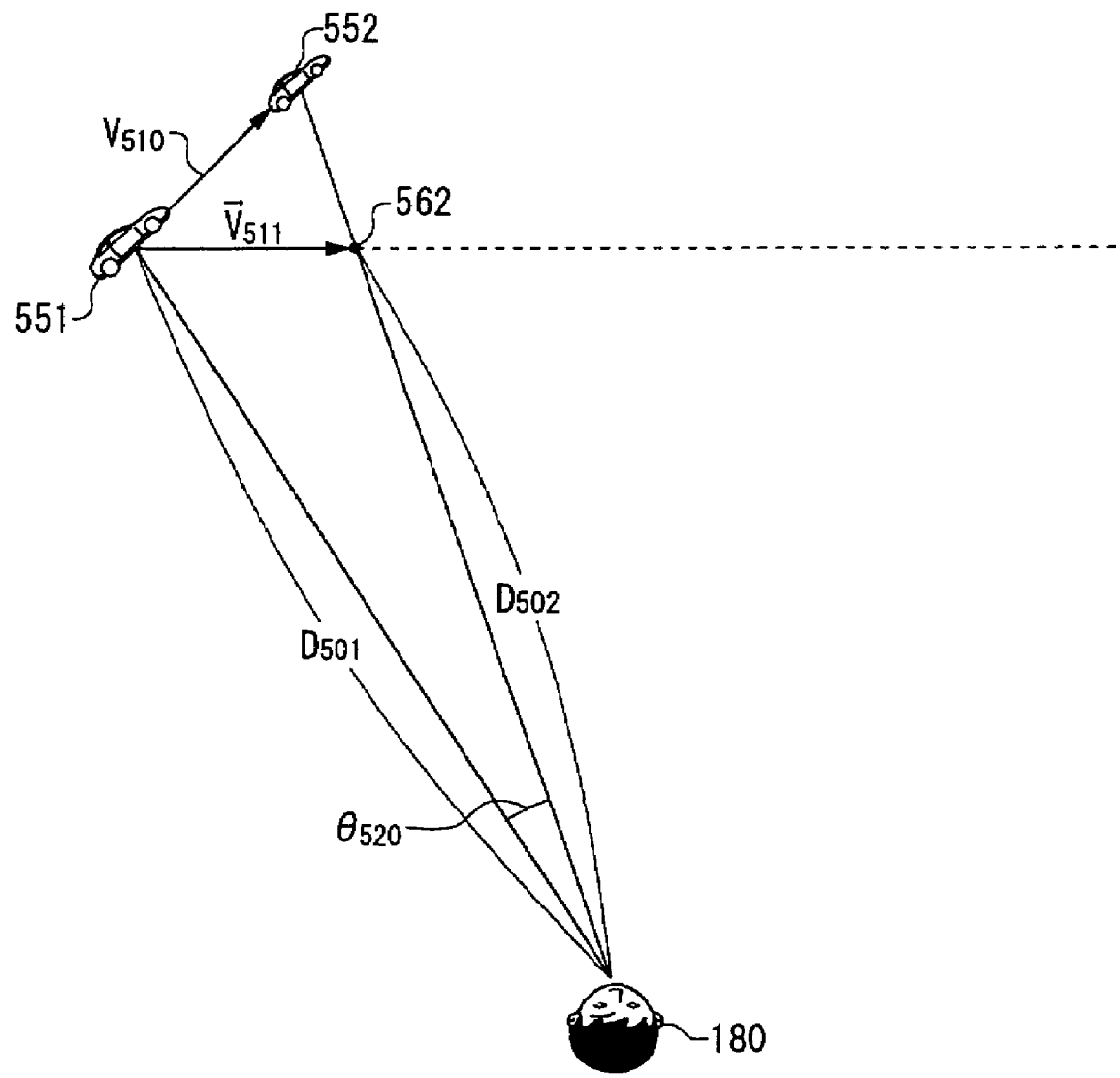
FIG. 5 is a view exemplary showing a computation method of a blurring amount in a three-dimensional moving image.

FIG. 5 is a view exemplary showing a computation method of a blurring amount in a three-dimensional moving image. The moving image replaying section 250 displays a moving image recorded in the moving image recording section 248 on the display screen 400 in three dimensions. The display screen 400 may be a three-dimensional display for displaying a three-dimensional moving image. For example, the moving image replaying section 250 continuously displays a plurality of frame images of each for a left and right eyes on the display screen 400, in order to make the user 180 see a moving image by three-dimensional display. The display screen 400 displays a frame image for the right eye toward the right eye of the user 180 so as not to enter into the left eye of the user 180 and displays a frame image for the left eye toward the left eye of the user 180 so as not to enter into the right eye of the user 180. In this case, the frame image generating section 246 each generates a frame image for the left eye and a frame image for the right eye.

Then, the movement computing section 242 computes a position 562 of an intersection between a face including a position 551, which is perpendicular to a sight line from a view point of the user 180 in a display space and a line linking a view point of the user 180 and a position 552, when detecting a movement of the subject from the position 551 to the position 552 in a three-dimensional display space between the continued frame images. Then, the movement computing section 242 computes a mobile vector V511 from the position 551 to the position 562 as a movement amount.

Then, the distance acquiring section 260 computes a distance D501 from a view point of the user 180 to the position 551 and a distance D502 from a view point of the user 180 to the position 562. Then, the predictive image generating section 244 computes a value α obtained by dividing the V511 by a mean value of the D501 and the D502 as a blurring amount.

In addition, since a method, in which the frame image generating section 246 generates a frame image from a predictive image generated from the predictive image generating section 244 according to a blurring amount, is the same method as that described in reference to FIGS. 3 and 4 except for separately generating a frame image for a left eye and a frame image for a right eye, their descriptions will be omitted.

In addition, the movement computing section 242 may compute a mobile vector V510 from the position 551 to the position 552 as a movement amount. Moreover, as described in reference to FIG. 4, the predictive image generating section 244 may compute, as a blurring amount, a value made by dividing a value, which is obtained by dividing the mobile vector V510 or V511 by the image capturing time difference that is the difference between a time taken when the position of the subject is at the position 551 and a time taken when the position of the subject is at the position 552, by a mean value of the D501 and the D502. Moreover, the predictive image generating section 244 may compute an amount proportional to the value α as a blurring amount, or may compute a value made by converting the value α into a predetermined function as a blurring amount. Moreover, the predictive image generating section 244 may compute an angle θ520 formed between a line linking a view point of the user 180 and the position 551 and a line linking a view point of the user 180 and the position 552, as a movement amount. Moreover, the predictive image generating section 244 may compute a value obtained by dividing the angle θ520 by the image capturing time difference as a blurring amount.

As described above, the moving image generating apparatus 160 can more largely blur an object moving at a more close position from the user 180 in three-dimensional display space. Therefore, the moving image generating apparatus 160 can provide a three-dimensional moving image, in which a movement of a moving object sees smoothly, to the user 180. In addition, in FIGS. 4 and 5, there is described an example of an operation by which the predictive image generating section 244 computes a blurring amount based on the movement amount and the distance. However, when the frame image generating section 246 performs an image processing emphasizing sharpness on an image, the frame image generating section 246 may compute an emphasis degree of sharpness for an area except the area of the subject for which the movement computing section 242 has computed the movement, based on the movement amount and the distance. In this case, the frame image generating section 246 can more highly compute an emphasis degree of sharpness as the movement amount is larger or as the distance is smaller.

According to the moving image generating apparatus 160 described above, it is possible to appropriately generate frame images for moving image that are smoothly replayed from an image for still image. For this reason, the user 180 can easily see a clear still image at an arbitrary timing at which the user 180 wants to see the image while enjoying a moving image.

Figure 6:
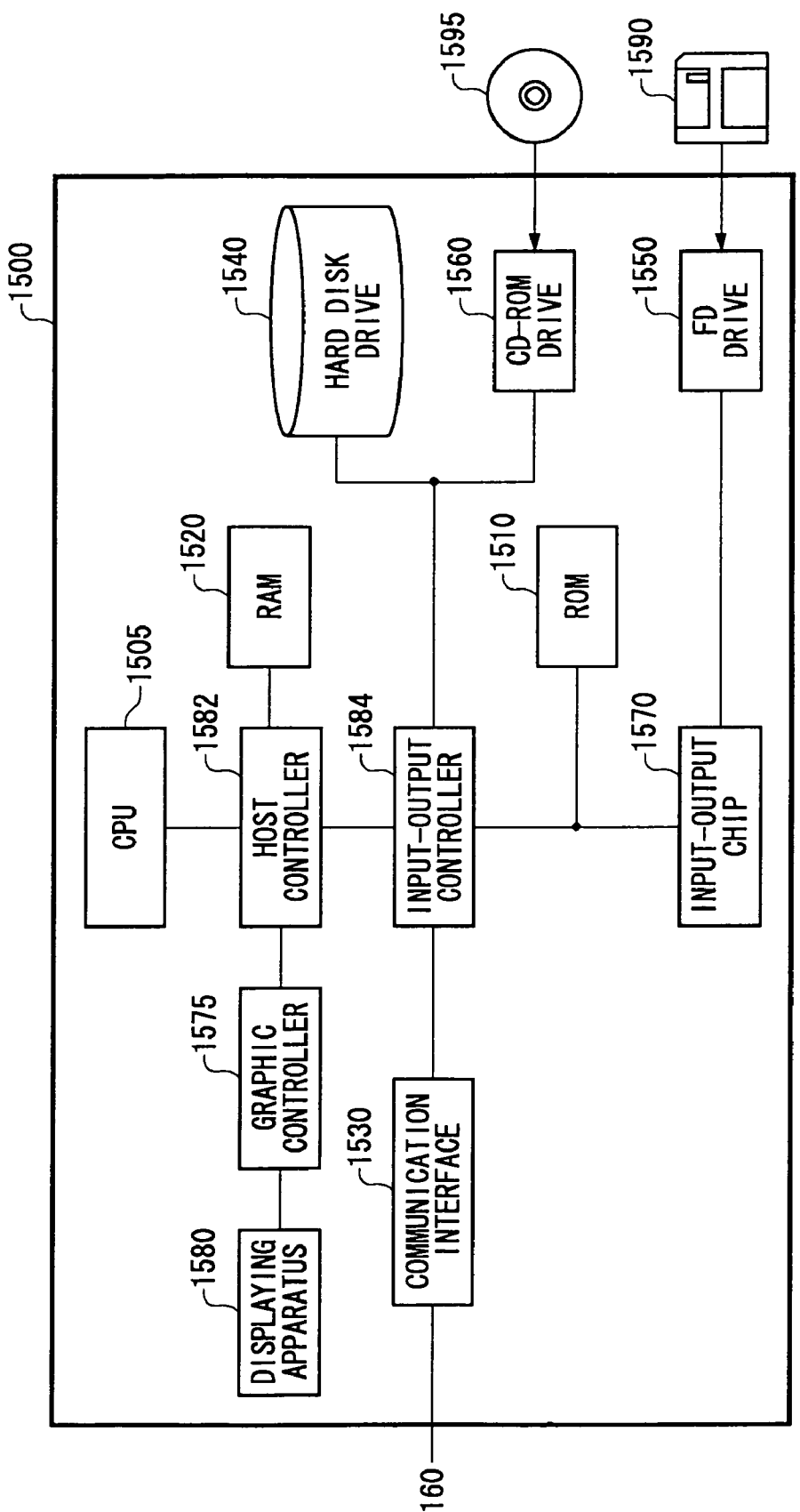
FIG. 6 is a view exemplary showing a hardware configuration of a computer according to a moving image generating apparatus.

FIG. 6 is a view exemplary showing a hardware configuration of a computer 1500 according to the moving image generating apparatus 160. The computer 1500 includes a CPU peripheral section having a CPU 1505, a RAM 1520, a graphic controller 1575, and a displaying apparatus 1580 that are connected to one another by a host controller 1582, an input-output section having a communication interface 1530, a hard disk drive 1540, and a CD-ROM drive 1560 that are connected to the host controller 1582 by an input-output controller 1584, and a legacy input-output section having a ROM 1510, a flexible disk drive 1550, and an input-output chip 1570 that are connected to the input-output controller 1584.

The host controller 1582 connects the RAM 1520 to the CPU 1505 and the graphic controller 1575 for accessing the RAM 1520 at high transfer rate. The CPU 1505 operates based on a program stored on the ROM 1510 and the RAM 1520 to control each section. The graphic controller 1575 acquires image data generated by the CPU 1505 on a frame buffer provided in the RAM 1520, and displays the data on the displaying apparatus 1580. Alternatively, the graphic controller 1575 may include therein the frame buffer storing the image data generated from the CPU 1505.

The input-output controller 1584 connects the host controller 1582 to the hard disk drive 1540, the communication interface 1530, and the CD-ROM drive 1560 that area comparatively fast input-output apparatus. The hard disk drive 1540 stores a program and data to be used by the CPU 1505 in the computer 1500. The communication interface 1530 communicates with the moving image generating apparatus 160 via a network, and provides the program and data to the moving image generating apparatus 160. The CD-ROM drive 1560 reads a program or data from a CD-ROM 1595, and provides the program or data to the hard disk drive 1540 and the communication interface 1530 via the RAM 1520.

Moreover, the ROM 1510, the flexible disk drive 1550, and the input-output chip 1570 that are a comparatively low-speed input-output apparatus are connected to the input-output controller 1584. The ROM 1510 stores a boot program to be executed during starting the computer 1500, a program dependent on hardware of the computer 1500, or the like. The flexible disk drive 1550 reads a program or data from a flexible disk 1590, and provides the program or data to the hard disk drive 1540 and the communication interface 1530 via the RAM 1520. The input-output chip 1570 connects various kinds of input-output apparatuses via the flexible disk drive 1550, or a parallel port, a serial port, a keyboard port, a mouse port.

A program provided to the communication interface 1530 via the RAM 1520 is stored on a recording medium such as the flexible disk 1590, the CD-ROM 1595, or an IC card in order to be provided by a user. The program is read from the recording medium, is provided to the communication interface 1530 via the RAM 1520, and is sent to the moving image generating apparatus 160 via a network. The program sent to the moving image generating apparatus 160 is installed and executed in the moving image generating apparatus 160.

The program to be installed and executed in the moving image generating apparatus 160 makes the moving image generating apparatus 160 function as the image capturing section 202, the image storing section 240, the movement computing section 242, the predictive image generating section 244, the frame image generating section 246, the moving image recording section 248, the distance acquiring section 260, and the moving image replaying section 250, described in FIGS. 1 to 3.

A program described above may be stored on an outside storage medium. A storage medium can include an optical recording medium such as DVD or PD, a magneto-optical recording medium such as MD, a tape medium, a semiconductor memory such as an IC card, in addition to the flexible disk 1590 and the CD-ROM 1595. Moreover, a storage device such as a hard disk or a RAM provided in a server system connected to a private communication network or an Internet may be used as a recording medium, and the program may be provided to the computer 1500 via a network.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A moving image generating apparatus, comprising:
an image storing section that stores a plurality of captured images continuously taken in a predetermined exposure time;
a movement computing section that computes a movement of a subject between a timing at which one captured image is taken and a timing at which a next captured image taken next to the one captured image is taken, based on a change of a position of the subject in the plurality of captured images;
a frame image generating section that performs an image processing on the plurality of captured images to generate a frame of moving image from the one captured image, in order that a blurring amount of an areal image of the subject included in the one captured image is larger than a blurring amount of other areal images, according to the movement of the subject computed from said movement computing section; and
a moving image recording section that records, as a moving image, a plurality of frame images each generated from said frame image generating section in association with each of the plurality of captured images.

2. The moving image generating apparatus as claimed in claim 1, wherein said frame image generating section performs a bluffing process on the areal image of the subject included in the one captured image in a direction in which the subject included in the one captured image moves, to generate a frame image from the one captured image.

3. The moving image generating apparatus as claimed in claim 1, wherein said frame image generating section performs a bluffing process on the areal image of the subject included in the one captured image to generate a frame image from the one captured image, so as to show a captured image taken in an exposure time longer than an exposure time when the one captured image has been taken, according to the movement of the subject computed from said movement computing section.

4. The moving image generating apparatus as claimed in claim 1, wherein
the moving image generating apparatus further comprises a predictive image generating section that generates a predictive image that may be taken when a subject is taken between the timing at which the one captured image has been taken and the timing at which the next captured image has been taken, based on the movement of the subject computed from said movement computing section, and
said frame image generating section performs a blurring process on the areal image of the subject included in the one captured image to generate a frame image from the one captured image, by overlapping the predictive image generated from said predictive image generating section on the one captured image.

5. The moving image generating apparatus as claimed in claim 4, wherein
said predictive image generating section generates a plurality of predictive images that may be taken when a subject is continuously taken at a predetermined interval between the timing at which the one captured image has been taken and the timing at which the next captured image has been taken, and
said frame image generating section performs a blurring process on the areal image of the subject included in the one captured image to generate a frame image from the one captured image, by overlapping the plurality of predictive images generated from said predictive image generating section on the one captured image.

6. The moving image generating apparatus as claimed in claim 1 wherein
the moving image generating apparatus further comprises an image capturing section that continuously takes a captured image in a predetermined exposure time, and
said image storing section stores a plurality of captured images taken by said image capturing section.

7. The moving image generating apparatus as claimed in claim 1, wherein
said movement computing section computes a movement amount by which the subject moves between the timing at which the one captured image has been taken and the timing at which the next captured image has been taken, based on the change of the position of the subject in the plurality of captured images, and
said frame image generating section performs a blurring process with a larger blurring amount on the areal image of the subject included in the one captured image to generate a frame image of moving image from the one captured image, when the movement amount of the subject computed from said movement computing section is larger.

8. The moving image generating apparatus as claimed in claim 1, wherein
said movement computing section computes a speed of the subject between the timing at which the one captured image has been taken and the timing at which the next captured image has been taken, based on the change of the position of the subject in the plurality of captured images and the time at which the plurality of captured images have been taken, and
said frame image generating section performs a blurring process with a larger blurring amount on the areal image of the subject included in the one captured image to generate a frame image of moving image from the one captured image, when the magnitude of the speed of the subject computed from said movement computing section is larger.

9. The moving image generating apparatus as claimed in claim 1, further comprising a moving image replaying section that continuously displays the plurality of frame images stored on said moving image recording section to replay them as a moving image.

10. The moving image generating apparatus as claimed in claim 1, wherein the moving image generating apparatus further comprises a distance acquiring section that acquires a distance between a position of a subject on a display screen, on which the plurality of frame images recorded in said moving image recording section are displayed, and a position of an observer who observes the plurality of frame images displayed on the display screen, and said frame image generating section performs a bluffing process with a larger blurring amount of the areal image of the subject included in the one captured image to generate a frame image of moving image from the one captured image, when said distance acquiring section acquires a smaller distance.

11. The moving image generating apparatus as claimed in claim 1, wherein the moving image generating apparatus further comprises a distance acquiring section that acquires a distance between a view point of an observer and the subject of which the movement is computed by said movement computing section in a three-dimensional display space, when said moving image recording section records the plurality of frame images in order to make the observer observe a moving image by three-dimensional display, and said frame image generating section performs a blurring process with a larger bluffing amount on the areal image of the subject included in the one captured image to generate a frame image of moving image from the one captured image, when said distance acquiring section acquires a smaller distance.

12. A moving image generating method, comprising steps performed by a moving image generating apparatus, said steps including:

an image storing step of storing a plurality of captured images continuously taken in a predetermined exposure time;

a movement computing step of computing a movement of a subject between a timing at which one captured image is taken and a timing at which a next captured image taken next to the one captured image is taken, based on a change of a position of the subject in the plurality of captured images;

a frame image generating step of performing an image processing on the plurality of captured images to generate a frame image from the one captured image, in order that a blurring amount of an areal image of the subject included in the one captured image is larger than a blurring amount of other areal images, according to the movement of the subject computed in said movement computing step; and a moving image recording step of recording, as a moving image, a plurality of frame images each generated in said frame image generating step in association with each of the plurality of captured images.

13. A computer-readable storage medium providing a program fef to a moving image generating apparatus that generates a moving image, the program making the moving image generating apparatus function as:

an image storing section that stores a plurality of captured images continuously taken in a predetermined exposure time;

a movement computing section that computes a movement of a subject between a timing at which one captured image is taken and a timing at which a next captured image taken next to the one captured image is taken, based on a change of a position of the subject in the plurality of captured images;

a frame image generating section that performs an image processing on the plurality of captured images to generate a frame image from the one captured image, in order to a blurring amount of an areal image of the subject included in the one captured image is larger than a blurring amount of other areal images, according to the movement of the subject computed from said movement computing section; and a moving image recording section that records, as a moving image, a plurality of frame images each generated from said frame image generating section in association with each of the plurality of captured images.

* * * * *